L. W. PROEGER.
APPARATUS FOR CUTTING OFF MOLTEN GLASS.
APPLICATION FILED NOV. 13, 1912.
1,100,776.
Patented June 23, 1914.
2 SHEETS—SHEET 1.
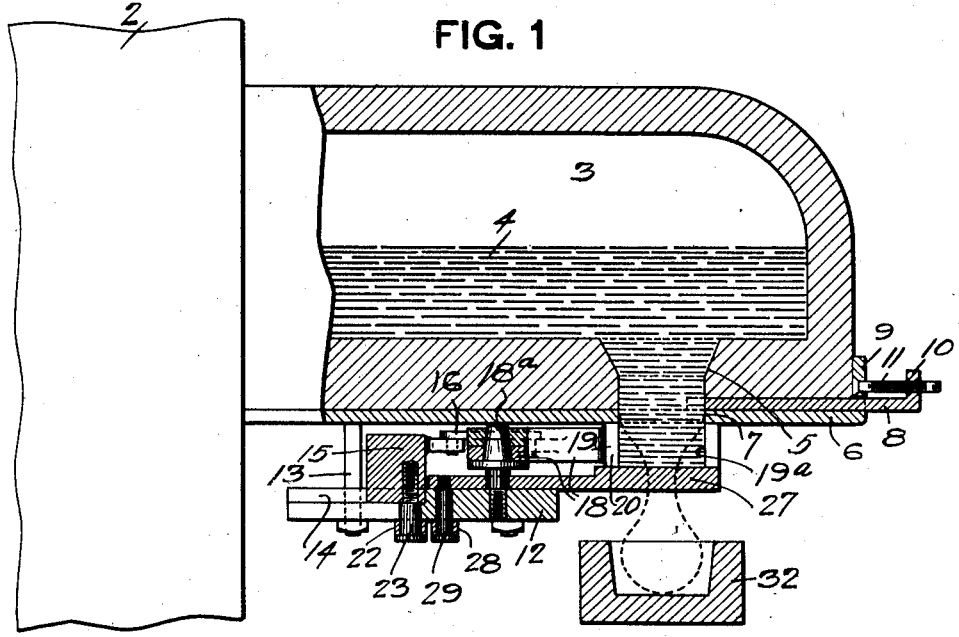

L. W. PROEGER.
APPARATUS FOR CUTTING OFF MOLTEN GLASS.
APPLICATION FILED NOV. 13, 1912.
1,100,776.
Patented June 23, 1914.
2 SHEETS—SHEET 2.
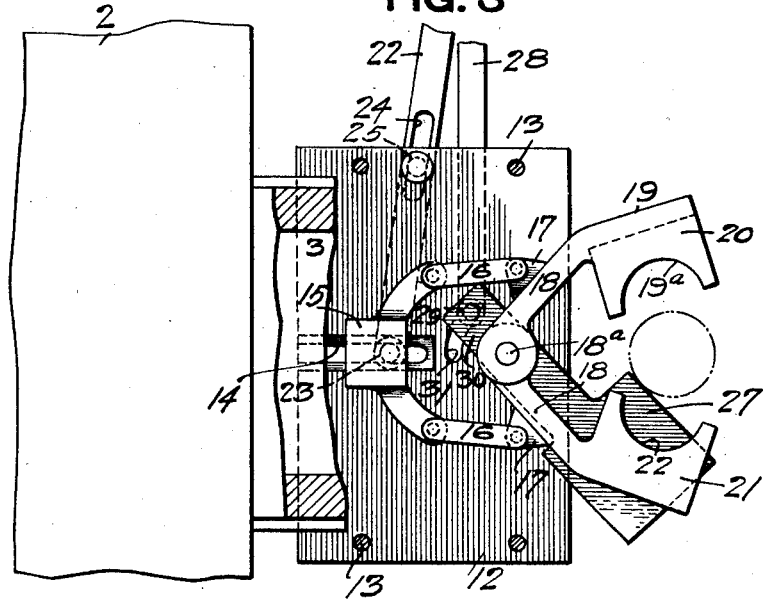
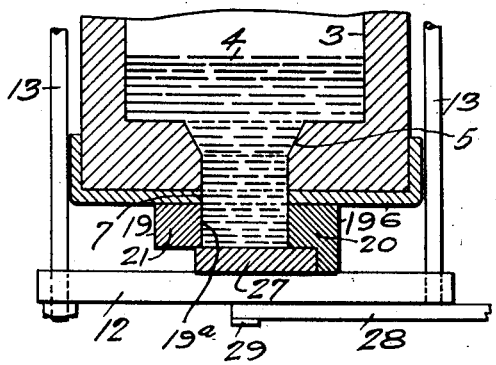
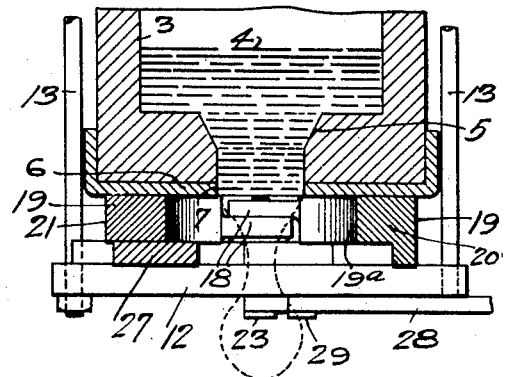
Witnesses
J. R. Keller
Robert C. Totten
Inventor
Luis W. Proeger
Kay & Totten
Attorneys

UNITED STATES PATENT OFFICE.

LUIS W. PROEGER, OF PITTSBURGH, PENNSYLVANIA.

APPARATUS FOR CUTTING OFF MOLTEN GLASS.

1,100,776.  Specification of Letters Patent.  Patented June 23, 1914.

Application filed November 13, 1912. Serial No. 731,203.

*To all whom it may concern:*

Be it known that I, LUIS W. PROEGER, a citizen of the United States, and resident of Pittsburgh, in the county of Allegheny and State of Pennsylvania, have invented a new and useful Improvement in Apparatus for Cutting Off Molten Glass; and I do hereby declare the following to be a full, clear, and exact description thereof.

My invention relates to apparatus for cutting off and delivering molten glass in measured quantities to molds or other receptacles.

In one of the forms of apparatus heretofore employed for this purpose, a plate or knife was arranged to move across an opening formed in the receptacle containing the supply of molten glass, the movement of said plate across said opening acting to shear or cut off the discharge of molten glass from said receptacle. In the practical operation of such device, however, it was found that the opening from said receptacle containing the molten glass would become clogged up by the chilling of the glass at the point of flow and eventually stop the flow of glass.

The object of my invention is to overcome this difficulty and to provide apparatus by means of which the opening leading from the receptacle containing the molten glass is kept open for the proper discharge and flow of the glass therethrough without chilling, so that the glass is discharged in even quantities, and a device can be kept working continuously without interruption due to the difficulties above set forth.

To these ends my invention consists, generally stated, in a receptacle containing a supply of molten glass having a discharge opening in the bottom and a member below said opening having an opening registering with the opening in said receptacle, and provided with movable walls so that said movable member can be separated from the glass passing through said opening, and a cutting off member in operative relation to said movable member for cutting off the supply of molten glass to the mold or the other receptacle below, said movable member and said cutting off member forming a closed extension to said first named receptacle containing less than the charge of glass required for the article to be found.

Referring to the accompanying drawings, Figure 1 is a sectional view of a receptacle containing the molten glass, and with my improved apparatus applied thereto, the parts being illustrated in the cutting-off position; Fig. 2 is a horizontal section of the receptacle containing the molten glass, the cutting-off apparatus being shown in dotted lines; Fig. 3 is a plan view of the cutting-off apparatus showing the parts open; Fig. 4 is a cross-section showing the parts in cutting off position; and Fig. 5 is a like view showing the shearing or cutting-off member withdrawn.

In the drawings, the numeral 2 designates a suitable tank or furnace for melting the glass and connected with said furnace is the receptacle 3 containing the molten glass 4 which flows into said receptacle from the furnace 2. The receptacle 3 is provided with the discharge opening 5, the walls of said discharge opening being chiefly formed of the refractory material forming the bottom of said receptacle, said bottom, however, being provided with a reinforcing plate 6 with an opening 7 registering with the discharge opening of said receptacle. In order to regulate the size of the discharge opening, I provide a plate 8 which is movable in a guide 9 in the receptacle 3. This plate is provided with the flange 10 through which the threaded bolt 11 passes, so that by the turning of said bolt the plate 8 is moved to and fro to control the size of the discharge opening 5.

Below the receptacle 3 is the supporting plate 12 which is carried by the rods 13. This plate 12 has the guide 14 and a yoke-member 15 is adapted to move back and forth in said guide. The yoke 15 has the links 16 pivotally connected thereto, and the outer ends of said links are pivotally secured to the lugs 17 on the arms 18 of the partible discharging member 19 formed in two halves 20 and 21. The two halves when united form the opening 19ª which registers with the openings 5 and 7, so that the molten glass from the receptacle 3 can pass through the movable discharge member 19. The arms 18 are mounted on the stud 18ª, which is threaded into the plate 12. A lever 22 is adapted to open and close the halves of the discharge member 19, and the inner end of said lever is connected by the bolt 23 to the yoke 15. The lever 22 has the slot 24 which engages the pin 25 on the supporting plate 12. It is apparent that by moving a lever 22 the yoke 15 is moved in the guide 14 and through the links 16, the halves 20, 21 are opened and closed. A cut-off or shearing-member 27 is also mounted on the stud 18ª and said shearing-member is operated by the arm 28, which has the pin 29 connected to the arm 30 of said shearing-member, and said pin 29 moves in the slot 31 in the supporting plate 12. By operating the lever 28, the shearing-member is moved in and out of shearing position, said partible discharge member 19 and said cut-off member 27 and forming a closed extension to the receptacle 3 and said extension containing a less quantity of glass than that required for the article to be formed.

When my improved device is in operation the mold or other receptacle 32 to receive the molten glass is brought around into proper position whereupon the arm 28 is operated to withdraw the shearing-member 27. Immediately following the withdrawal of the shearing-member 27, the halves of the discharge member are separated by operation of the lever 22, permitting the molten glass to drop into the receptacle or mold 32, and just as soon as said shearing-member and discharge member are removed the glass will elongate into substantially the shape indicated in Fig. 1, and when the proper amount of glass has been delivered to the receptacle 32, the halves of the discharge member are closed and immediately following the shearing member 27 is brought into closed position and in its movement acts to shear or cut off the supply of molten glass. In this manner the glass contained within the extension formed by the discharge member 19 and the cut-off member 27 is discharged into the mold or receptacle 32 below, and in addition, a portion of the glass is discharged through the discharge outlet 5 from the receptacle 3 until the amount of glass required to make the article has been delivered to the mold or other receptacle 32. By the employment of the supplemental or auxiliary discharge member 19, which has movable walls, the glass is prevented from chilling or clogging up the discharge opening as the shearing member cuts off the glass at the movable discharge member. By cutting off the glass at the movable discharge member instead of at the stationary discharge, I discharge direct from the receptacle 3 and chilling of the glass and clogging up of said discharge is prevented, due to the fact that the halves 20 and 21 of the movable discharge member are separated at each operation so that the glass does not have an opportunity to chill or adhere to the walls surrounding the opening of said movable member and furthermore, the glass will not adhere to the walls of the movable halves when they are opened. The glass is discharged in even and uniform quantities to the receptacle below and the device can be relied on to give the proper amount of glass each time as well as furnish the glass in such molten condition as to be readily blown to form of the desired article.

What I claim is:

1. In apparatus for cutting off molten glass in the manufacture of glass articles, the combination of a receptacle for molten glass having a discharge outlet, a partible member below said receptacle having an opening registering with said outlet in said receptacle, and a cut-off member forming with said partible member a closed extension to said receptacle, said extension containing less than the charge of glass required for the article to be formed.

2. In apparatus for cutting off molten glass in the manufacture of glass articles, the combination of a receptacle for molten glass having a discharge outlet, a member comprising swinging sections having an opening registering with the outlet in said receptacle, and a cutting off member swinging in a plane below said first member and forming with said first member a closed extension to said receptacle, said extension containing less than the charge of glass required for the article to be formed.

3. In apparatus for cutting off molten glass in the manufacture of glass articles, the combination of a receptacle for the molten glass having a discharge outlet in the bottom thereof, a member below said receptacle comprising swinging sections having an opening registering with the outlet in said receptacle, a swinging cut-off member in a plane below said member and forming with said member a closed extension to said receptacle, said extension containing less than the charge of glass required for the article to be formed, and means for operating said members independently of each other.

In testimony whereof, I the said LUIS W. PROEGER have hereunto set my hand.

LUIS W. PROEGER.

Witnesses:
ROBERT C. TOTTEN,
JOHN F. WILL.